United States Patent
Ni et al.

(10) Patent No.: US 9,924,337 B2
(45) Date of Patent: Mar. 20, 2018

(54) METHOD AND APPARATUS FOR PROCESSING EMERGENCY CALL OF COMMUNICATION TERMINAL

(71) Applicant: Spreadtrum Communications (Shanghai) Co., Ltd., Zhangjiang, Shanghai (CN)

(72) Inventors: Jinjin Ni, Shanghai (CN); Ping Jiang, Shanghai (CN)

(73) Assignee: SPREADTRUM COMMUNICATIONS (SHANGHAI) CO., LTD., Zhangjiang, Shanghai (CN)

( * ) Notice: Subject to any disclaimer, the term of this patent is extended or adjusted under 35 U.S.C. 154(b) by 402 days.

(21) Appl. No.: 14/671,302

(22) Filed: Mar. 27, 2015

(65) Prior Publication Data
US 2015/0304830 A1    Oct. 22, 2015

(30) Foreign Application Priority Data
Apr. 17, 2014    (CN) .......................... 2014 1 0155808

(51) Int. Cl.
*H04W 4/22* (2009.01)
*H04W 4/02* (2018.01)
*H04M 3/51* (2006.01)

(52) U.S. Cl.
CPC ........... *H04W 4/22* (2013.01); *H04M 3/5116* (2013.01); *H04W 4/02* (2013.01); *H04M 2242/04* (2013.01); *H04M 2242/30* (2013.01)

(58) Field of Classification Search
CPC ....... G08B 25/004; G08B 25/10; H04W 4/22; H04W 4/16; H04W 16/14; H04W 24/08;
(Continued)

(56) References Cited

U.S. PATENT DOCUMENTS

| 2015/0065077 A1* | 3/2015 | Kim ...................... H04W 4/22 455/404.1 |
| 2016/0057592 A1* | 2/2016 | Tagg ................... H04W 84/042 455/414.1 |

FOREIGN PATENT DOCUMENTS

| CN | 1279572 A | 1/2001 |
| CN | 101212801 A | 7/2008 |

(Continued)

OTHER PUBLICATIONS

SIPO First Office Action corresponding to Application No. 201410155808.7; dated Dec. 25, 2017.

*Primary Examiner* — Phuoc H Doan
(74) *Attorney, Agent, or Firm* — Cantor Colburn LLP (57) ABSTRACT

A method and an apparatus for processing an emergency call of a communication terminal are provided. The method includes: obtaining current country or region information based on resident cell system information of the communication terminal; when an emergency request, which contains an emergency call category requested by a user, is received, retrieving a first storage region based on the current country or region information and the requested emergency call category to determine a call mode corresponding to the requested emergency call category in the current country or region, where the first storage region stores call modes corresponding to multiple emergency call categories and multiple countries and regions; and connecting with an emergency call center based on the determined call mode. Accordingly, users of the communication terminal can get emergency services conveniently, promptly and efficiently no matter which country or region he or she resided.

18 Claims, 3 Drawing Sheets

(58) Field of Classification Search
CPC ....... H04W 28/16; H04W 64/00; H04W 4/06; H04W 4/24; H04W 72/04
USPC ........ 455/454, 456.1, 161.1, 453.3; 370/401, 370/312
See application file for complete search history.

(56) References Cited

FOREIGN PATENT DOCUMENTS

| | | |
|---|---|---|
| CN | 101282578 A | 10/2008 |
| CN | 101384049 A | 3/2009 |
| CN | 102104675 A | 6/2011 |

* cited by examiner

METHOD AND APPARATUS FOR PROCESSING EMERGENCY CALL OF COMMUNICATION TERMINAL

CROSS-REFERENCE TO RELATED APPLICATIONS

The present invention claims priority under 35 U.S.C. § 119 to Chinese Application No. 201410155808.7 filed Apr. 17, 2014, the entire content of which is incorporated herein by reference.

TECHNICAL FIELD

The present disclosure generally relates to communication technology, and more particularly, to a method and an apparatus for processing emergency call of a communication terminal.

BACKGROUND

Although the 3GPP ($3^{rd}$ Generation Partnership Project) has clearly specified some rules for emergency call, in practice, there are still many differences among implementations for emergency calls in different countries. For example, the emergency phone number for police in the United States is 911, while in China it is 110. When calling for an emergency service, in some countries, such as the United States, only the emergency call category (e.g. Police, Fire, and so on) is required. This kind of call mode is referred to as emergency call mode which is based on 3GPP. In some countries, such as China, when calling for an emergency service, not only the emergency call category but also the destination number is required. Note that the destination numbers vary from country to country, so it would be troublesome.

With the enhancement of international communication, it is common for users of communication terminals (e.g. mobile phones) to travel from country to country. These users may encounter emergency situations, thus corresponding emergency services are needed. For example, when someone is robbed, an emergency call for police is in urgent need. However, as emergency phone numbers are different among different countries, and even in a same country, the emergency phone numbers are different for different kinds of emergency services. Besides, as recited above, the call modes may be different as well. Therefore, when someone desires to call for police, he or she needs to know the corresponding call mode and/or the corresponding destination number, which is troublesome and may cause sever damages due to delay of emergency service.

Therefore, a method and an apparatus, which can provide a universal emergency call service, are required.

SUMMARY

According to one embodiment of the present disclosure, a method for processing emergency call of a communication terminal is provided. The method includes: obtaining current country or region information based on resident cell system information of the communication terminal; when an emergency request, which contains an emergency call category requested by a user, is received, retrieving a first storage region based on the current country or region information and the requested emergency call category to determine a call mode corresponding to the requested emergency call category in the current country or region, where the first storage region stores call modes corresponding to multiple emergency call categories and multiple countries and regions; and connecting with an emergency call center based on the determined call mode.

In some embodiments, each of the multiple countries and regions is represented in the first storage region as at least one selected from a group consisting of a mobile country code, a mobile network code, and a country or region name.

In some embodiments, the call mode corresponding to one of the multiple emergency call categories is either an emergency call mode or an ordinary call mode.

In some embodiments, if the call mode corresponding to the one of the multiple emergency call categories is the ordinary call mode, the first storage region further stores a destination number corresponding to the one of the multiple emergency call categories.

In some embodiments, connecting with the emergency call center based on the determined call mode includes: if the determined call mode is an emergency call mode, calling the emergency call center using the determined emergency call mode to deliver the requested emergency call category to the emergency call center; or if the determined call mode is an ordinary call mode, calling the emergency call center using a destination number corresponding to the requested emergency call category.

In some embodiments, the method further includes: providing a first prompt of inserting SIM card into the communication terminal, if the determined call mode is an ordinary call mode and the communication terminal is not equipped with a SIM card.

In some embodiments, the method further includes: if no result is obtained by retrieving the first storage region based on the current country or region information and the requested emergency call category, calling the emergency call center using an emergency call mode to deliver the requested emergency call category to the emergency call center.

In some embodiments, the first storage region is set in the communication terminal.

In some embodiments, information stored in the first storage region is updated based on information stored in a second storage region set in a server, where the second storage region stores real-time information corresponding to multiple emergency call categories and multiple countries and regions.

In some embodiments, information in the first storage region and information in the second storage region are both stored in a list form.

In some embodiments, the method further includes: if no result is obtained by retrieving the first storage region based on the current country or region information and the requested emergency call category, providing a second prompt of retrieving the second storage region or dialing an emergency phone number manually.

In some embodiments, the method further includes: providing a plurality of emergency call options with preset call categories on a user interface of the communication terminal, where the emergency call request is triggered when one of the plurality of emergency call options is selected.

According to one embodiment of the present disclosure, an apparatus for processing emergency call of a communication terminal, includes: a first storage region adapted to store call modes corresponding to multiple emergency call categories and multiple countries and regions; an acquisition unit adapted to obtain current country or region information based on cell system information of the communication terminal; a retrieving unit which is adapted to: when an emergency request which contains an emergency call category requested by a user is received, retrieve the first storage region to determine a call mode corresponding to the requested emergency call category in the current country or region; and a connection-built unit adapted to connect with an emergency call center based on the determined call mode.

In some embodiments, the call mode corresponding to one of the multiple emergency call categories is either an emergency call mode or an ordinary call mode.

In some embodiments, the connection-built unit includes: a first calling unit which is adapted to: if the determined call mode is an emergency call mode, call the emergency call center using the determined emergency call mode to deliver the requested emergency call category to the emergency call center; and a second calling unit which is adapted to: if the determined call mode is an ordinary call mode, call the emergency call center using a destination number corresponding to the requested call category.

In some embodiments, the apparatus further includes a first prompting unit which is adapted to: provide a first prompt of inserting SIM card into the communication terminal, if the determined call mode is an ordinary call mode and the communication terminal is not equipped with a SIM card.

In some embodiments, the apparatus further includes a third calling unit which is adapted to: if no result is obtained by retrieving the first storage region based on the current country or region information and the requested emergency call category, call the emergency call center using an emergency call mode to deliver the requested emergency call category.

In some embodiments, the apparatus further includes: a second storage region which is set in a server and adapted to store real-time information corresponding to multiple emergency call categories and multiple countries and regions; and an updating unit which is adapted to update information stored in the first region based on information stored in the second storage region.

In some embodiments, the apparatus further includes a second prompting unit which is adapted to: if no result is obtained by retrieving the first storage region based on the current country or region information and the requested emergency call category, provide a second prompt of retrieving the second storage region or dialing an emergency phone number manually.

In some embodiments, the apparatus further includes: an offering unit adapted to provide a plurality of emergency call options with preset call categories on a user interface of the communication terminal; and a triggering unit adapted to trigger the emergency request when one of the plurality of emergency call options is selected.

Accordingly, current country or region where the communication terminal resided is able to be automatically determined according to resident cell system information. Thereafter, through retrieving a first storage region, which stores call modes corresponding to multiple emergency call categories and multiple countries and regions, a call mode corresponding to a requested emergency call category in the current country or region is able to be determined. Thus, the communication terminal is able to be connected with a corresponding emergency call center based on the determined call mode. By such way, when a user of the communication terminal needs an emergency service, he or she is only required to give a requested emergency call category (e.g. by ways of selecting an emergency call category from a plurality of emergency call options). Therefore, the method and the apparatus provided by the present disclosure are user friendly. In other words, the user can get emergency services conveniently, promptly and efficiently. Furthermore, since obstacles caused by differences among countries are overcome, users of the communication terminal can get emergency services easily no matter which country or region he or she resided currently. Thus, the method and the apparatus can be used worldwide.

Furthermore, by setting a second storage region which stores real-time information corresponding to multiple countries and regions, the information stored in the first storage region can be automatically updated online Therefore, the method and the apparatus provided by the present disclosure are more precious.

DETAILED DESCRIPTION

In order to clarify the objects, characteristics and advantages of the present disclosure, embodiments of the present disclosure will be described in detail in conjunction with the accompanying drawings. The disclosure will be described with reference to certain embodiments. Accordingly, the present disclosure is not limited to the embodiments disclosed. It will be understood by those skilled in the art that various changes may be made without departing from the spirit or scope of the disclosure.

Figure 1:
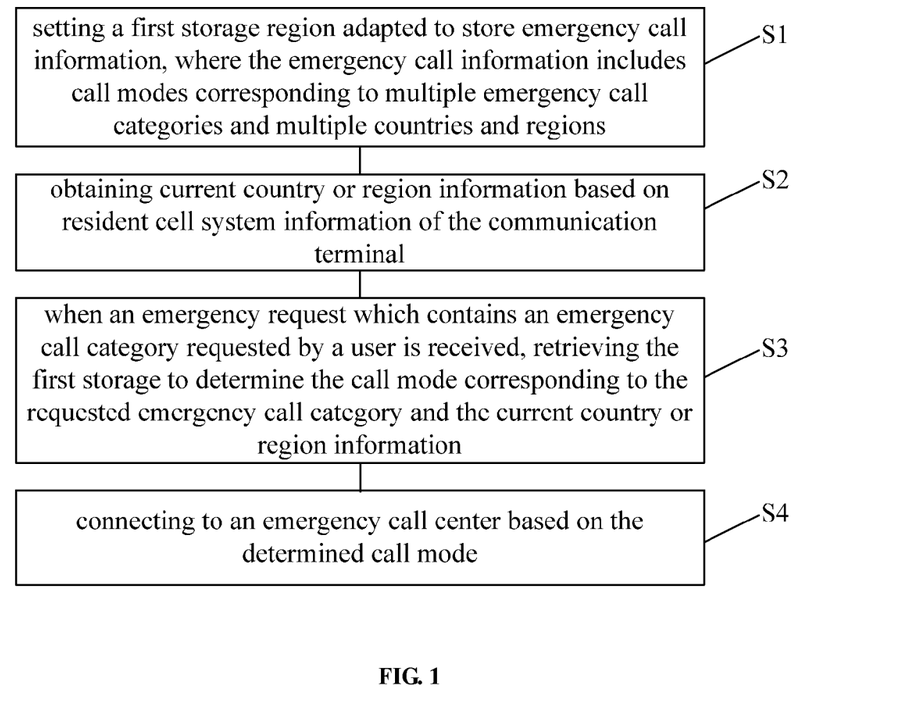
FIG. 1 schematically illustrates a flow chart of a method for processing an emergency call request of a communication terminal according to one embodiment of the present disclosure.

Referring to FIG. 1, a method for processing emergency call of a communication terminal is illustrated. The method includes four steps from S1 to S4 as follow.

In step S1, setting a first storage region adapted to store emergency call information, where the emergency call information includes call modes corresponding to multiple emergency call categories and multiple countries and regions.

In step S2, obtaining current country or region information based on resident cell system information of the communication terminal.

In step S3, when an emergency request which contains an emergency call category requested by a user is received, retrieving the first storage to determine the call mode corresponding to the requested emergency call category and the current country or region information.

In step S4, connecting to an emergency call center based on the determined call mode.

In some embodiments, the communication terminal may be a mobile device which is adapted to support all kinds of protocols or combinations of the protocols, such as a mobile phone (including smart phone, feature phone, and so on), or a tablet computer which is configured with a wireless communication module and a voice call module. The protocols are well known in the art, for example, LTE (Long Term Evolution), TD-SCDMA (Time Division Synchronous Code Division Multiple Access), WCDMA (Wideband Code Division Multiple Access), CDMA 2000 (Code Division Multiple Access 2000), GSM (Globe System of Mobile Communication), etc.

In some embodiments, the emergency call refers to number dialing for an emergency service, wherein the number dialing may be implemented by using an emergency call mode specified in the 3GPP protocol, or implemented by an ordinary call mode. Accordingly, the call mode corresponding one emergency call category may be either the emergency call mode or the ordinary call mode. In other words, when the call mode is the emergency call mode, it means only the emergency call category is required to connect with a corresponding emergency call center. When the call mode is the ordinary call mode, it means a given phone number for the required emergency service is also required, that is, the user need to dial the given phone number, in the way like other non-emergency calls, to connect with a corresponding emergency call center.

In some embodiments, the first storage region is set in the communication terminal, and the emergency call information is stored in the first storage region in form of a list. Thus, the first storage region also can be referred to as national or regional emergency call information list (or emergency call information list for short). The emergency call information list is used for recording call modes of all kinds of emergency call categories within multiple countries and regions. Accordingly, retrieving the first storage region, in fact, is retrieving the emergency call information list.

In some embodiments, the first storage region is set in an external storage device with respect to the communication terminal. Thus, emergency call information stored in the first storage region is able to be obtained from the storage device by way of wireless communication.

It should be noted that, the emergency call information is able to be stored in the first storage region in other forms besides the list form.

In some embodiments, the emergency call information may include, but not limited to: country and region names, mobile country codes, emergency call categories, call modes, destination numbers, etc. The country and region Names correspond one to one with the mobile country codes. Each of the country and Region names corresponds to at least one of the emergency call categories (e.g. POLICE, FIRE, and so on). Each of the emergency call categories corresponds to one of the call modes and one of the destination numbers. Furthermore, each of the emergency call categories may correspond to a specific emergency call center, thus, in some embodiments, types of the emergency call center can be taken as the emergency call categories. An exemplary emergency call information list is illustrated in Table 1.

TABLE 1

| Item | Country or Region Name | Mobile Country Code | Emergency Call Category | Call Mode | Destination number |
|---|---|---|---|---|---|
| 1 | A | 310 | POLICE | Emergency Call | NA |
|   |   |   | FIRE | Emergency Call | NA |
| 2 | B | 460 | POLICE | Ordinary Call | 110 |
|   |   |   | FIRE | Ordinary Call | 119 |

In Table 1, "Item" may refer to index entry of the emergency call information list, thus the index entries are able to be used for achieving quick search of the emergency call information. When the mobile country code is "460", the country or region name "A" corresponding to the mobile country code represents "China". Similarly, when the mobile country code is "310", the country or region name "B" corresponding to the mobile country code represents the "U.S.". When the call mode is the emergency call mode, destination number of the emergency call center is not needed according to related communication protocols, thus "NA" shown in the Table 1 represents that the destination number is a null value. When the call mode is the ordinary call mode, destination number of the emergency call center is required. For example, in a country or region with a mobile country code of "460", destination number corresponding to an emergency call category of "FIRE" is "119". It should be noted that, the Table 1 only shows a partial content of the emergency call information list. In some embodiments, the emergency call information list may include more content than shown in Table 1.

Figure 2:
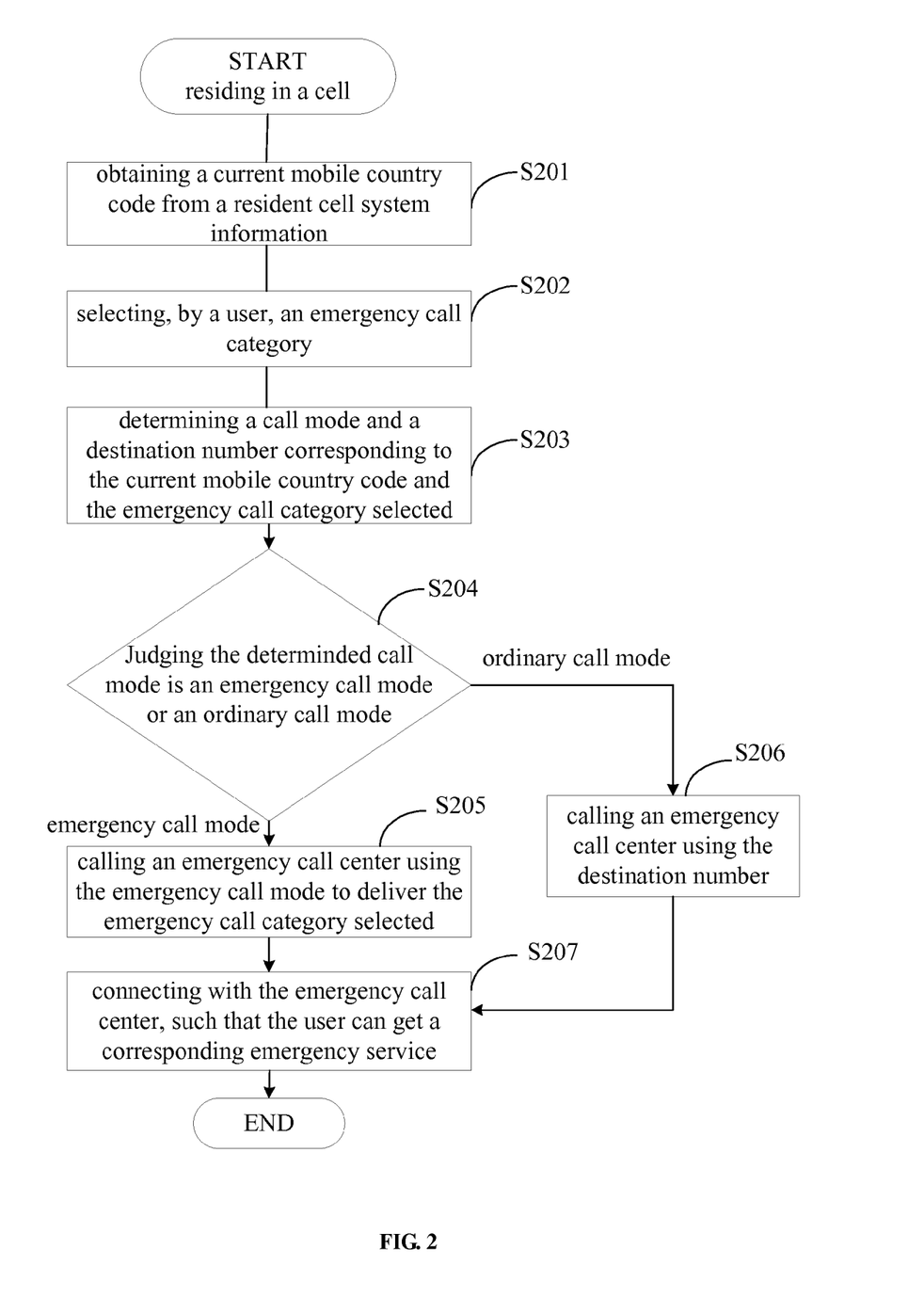
FIG. 2 schematically illustrates a flow chart of a process for processing an emergency call request according to one embodiment of the present disclosure.

After the emergency call information list is set (that is, step S1 shown in FIG. 1), a flow chart of a process for processing emergency call is illustrated in FIG. 2.

As shown, in S201, obtaining a current mobile country code from a resident cell system information. Step S201 is implemented after a communication terminal resides in a cell (that is a resident cell). Further, since mobile country codes are under unified allocation and management of the ITU (International Telecommunication Union), thus a mobile country code is able to be used for identifying a country or a region. Accordingly, a current country or region information can be identified based on the current mobile country code obtained from the resident cell system information. Thereafter, the call mode corresponding to the current country or region information can be determined by retrieving the emergency call information list. S201 can be implemented by ways known to the art, which will not be illustrated in detail herein.

It should be noted that, in some embodiments, the country and region information (recited in S2 in FIG. 1) only includes the mobile country codes. In some embodiments, the country and region information may include the mobile country codes and the country or region names. In some embodiments, the country and region information may include the mobile country codes, mobile network codes, and the country or region names. In other words, each of the multiple countries and regions may be represented in the first storage region as at least one selected from a group consisting of a mobile country code, a mobile network code, and a country or region name.

In some embodiments, the call mode of each operator within one country or region may be different from each other. In this case, the mobile network code is required. The emergency call information list further includes operator information (Mobile Country Code and Mobile Network Code) which is a column of the emergency call information list. Therefore, when retrieving the emergency call information, corresponding operator information can be obtained as well.

In S202, selecting, by a user, an emergency call category. Step S202 corresponds to the step S3 in FIG. 1. Specifically, an emergency request is triggered after an emergency call category is selected, where the emergency call category is selected through a user interface of the communication terminal. The emergency request may include an emergency call category selected by a user. For example, if the user selects the emergency call category of "FIRE" through the user interface, then the requested emergency call category carried by the emergency request is "FIRE".

In S203, determining the call mode and the destination number corresponding to the current mobile country code and the emergency call category selected. Specifically, the call mode and the destination number corresponding to the current mobile country code and the emergency call category selected is determined by retrieving the emergency call information list. For example, supposing the current mobile country code is "460", and the emergency call category selected is "FIRE", thus through retrieving the emergency call information list as shown in the Table 1, it can be obtained that the call mode, which corresponds to the mobile country code of "460" and the emergency call category of "FIRE", is "Ordinary Call", and the destination number, which corresponds to the mobile country code of "460" and the emergency call category of "FIRE", is "119".

In step S204, judging the call mode is an emergency call mode or an ordinary call mode. If the call mode is the emergency call mode, then step 205 as follows will be implemented. If the call mode is the ordinary call mode, then step 206 as follows will be implemented.

In step S205, calling an emergency call center using the emergency call mode to deliver the selected emergency call category to the emergency call center.

In step S206, calling an emergency call center based the destination number corresponding to the selected emergency call category.

In step S207, connecting with the emergency call center, such that the user can get a corresponding emergency service.

It should be noted that, in some embodiments, if the call mode and the destination number are unable to be determined by retrieving the emergency call information list, step S205 will be implemented. In other words, the method further includes: if no result is obtained by retrieving the first storage region based on the current country or region information and the selected emergency call category, calling the emergency call center using the emergency call mode to deliver the selected emergency call category to the emergency call center.

In some embodiments, the call mode is judged as the ordinary call mode, and the communication terminal is not equipped with a SIM (Subscriber Identity Module) card or a USIM (Universal Subscriber Identity Module) card. In this case, the method may further include: providing a first prompt of inserting SIM card or USIM card into the communication terminal or dialing the destination number through other ways.

In some embodiments, a plurality of emergency call options with preset call categories, such as POLICE, FIRE, or emergency aid center, may be provided on the user interface. Thus, the user can select a desired emergency call option for trigging an emergency request. In some embodiments, the emergency call options are able to be provided on the user interface by being added into a phone book of the communication terminal. Specifically, the emergency call options are shown on a contact list of the phone book, where the emergency call options are on the top of the contact list, such as being illustrated on Table 2 as follows.

TABLE 2

| Contact List |
| --- |
| FIRE |
| POLICE |
| Emergency Aid Center |
| . . . |
| Contact A |
| Contact B |

Accordingly, emergency call services can be achieved by only providing the emergency call options, such as POLICE, FIRE, or emergency aid center, on the user interface. Specifically, when there is an emergency situation, such as a fire, the user only need to select "FIRE" from the emergency call options. Based on the "FIRE" selected, the communication terminal is able to be connected with a corresponding emergency call center. Thus, the user is not required to know the call modes of all emergency call categories in the country or region she/he resided. Therefore, when in emergency situations, the user is able to get a specific emergency service and help easily and promptly.

In some embodiments, the emergency call information list is able to be updated, such that up-to-date emergency call information is obtained. The emergency call information list may be automatically updated online.

Specifically, the method may further include: setting a second storage region in a server corresponding to the communication terminal, where the second storage region is adapted to store real-time emergency call information; and when the real-time emergency call information stored in the second storage region changes, updating the first storage region based on the change of the real-time emergency call information. In some embodiments, the real-time emergency call information stored in the second storage region may be also in the form of a list similar to that in the first storage region.

Figure 3:
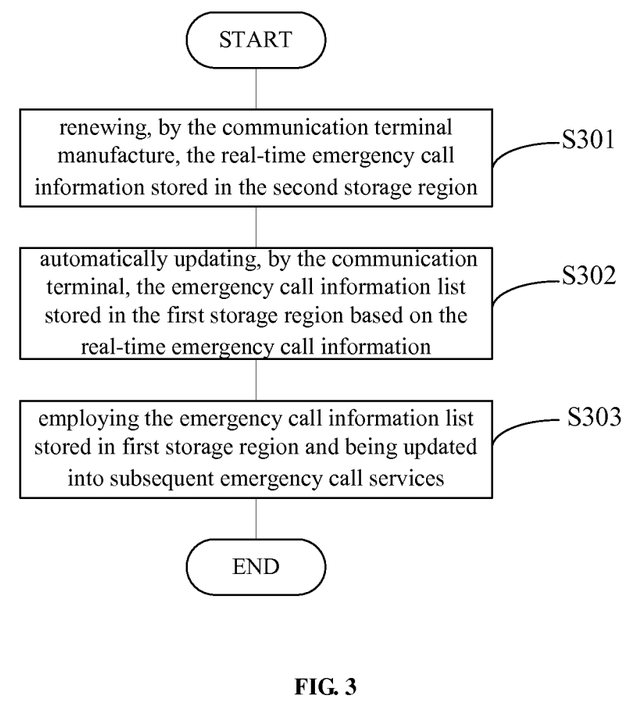
FIG. 3 schematically illustrates a flow chart of a process for automatically updating an emergency call information list according to one embodiment of the present disclosure.

In some embodiments, the real-time emergency call information may be maintained by communication terminal manufactures or operators. Specifically, the communication terminal manufactures or operators will renew the real-time emergency call information stored in the second storage region of the server when there is any change By such way, the emergency call information list stored in the first storage region of the communication terminal is able to be automatically updated online according to the renewal of the real-time emergency call information. FIG. 3 schematically illustrates an exemplary flow chart of a process for updating the emergency call information list stored in the first storage region.

As shown in FIG. 3, in step S301, renewing, by the communication terminal manufacture, the real-time emergency call information stored in the second storage region.

In step S302, automatically updating, by the communication terminal, the emergency call information list stored in the first storage region based on the real-time emergency call information online.

In step S303, employing the emergency call information list stored in first storage region and being updated into subsequent emergency call services.

In some embodiments, the updating function of the communication terminal is able to be completely disabled or partially disabled by the user. Specifically, when the updating function of the communication terminal is completely disabled, updating the emergency call information list stored in the first storage region as recited in S302 is unable to be implemented, that is the emergency call information list stored in the first storage region can not be automatically updated online. When the updating function of the communication terminal is partially disabled, updating the emergency call information list stored in the first storage region as recited in S302 is only able to be implemented on certain conditions, such as there is a wireless network (e.g. WIFI).

Accordingly, through above recited process, real-time emergency call information is able to be obtained by the communication terminal from the server. By such way, the emergency call information list stored in the communication terminal is more precise.

Furthermore, in some embodiments, if no result is obtained by retrieving the first storage region based on the current country or region information and the requested emergency call category, such as call mode or destination number, is not determined by retrieving the first storage region, a prompt may be provided on the user interface of the communication terminal to allow the user retrieving the real-time emergency information stored in the second storage region online or dialing an emergency phone number manually.

Accordingly, by setting a first storage region which stores country and region information (e.g. mobile country codes, mobile network codes, country or region names, and so on), current country or region where the communication terminal resided is able to be determined according to resident cell system information, wherein the resident cell system information includes the mobile country code of the current country or region. The first storage region also stores with call modes of all emergency call categories within each country or region, thus by retrieving the first storage region, call mode of an emergency call category requested in the current country or region is able to be obtained. Thereafter, the communication terminal is able to be connected with a corresponding emergency call center based on the call mode. By such way, when a user of the communication terminal needs an emergency service, he or she is only required to give an emergency call category (e.g. by ways of selecting an emergency call category from a plurality of emergency call options). Therefore, the method and the apparatus provided by the present disclosure are user friendly. In other words, the user can get emergency services conveniently, promptly and efficiently. Furthermore, since limitations caused by differences among countries are overcome, users of the can get emergency services easily no matter which country or region he or she resided currently. Thus, the method and the apparatus can be used worldwide.

Furthermore, by setting a second storage region which stores real-time country or region information, the country and region information stored in the first storage region can be automatically updated online Therefore, the method and the apparatus provided by the present disclosure are more precious.

The present disclosure also provides an apparatus for processing emergency call of a communication terminal. The apparatus includes: a first storage region which is adapted to store emergency call information, wherein the emergency call information includes country and region information and corresponding call modes; an acquisition unit which is adapted to obtain current country or region information based on resident cell system information; a retrieving unit which is adapted to retrieve the first storage region when an emergency request which contains an emergency call category requested by a user is received, so as to determine the call mode corresponding to the current country or region information and the requested emergency call category; and a connection-built unit which is adapted to connect the communication terminal with an emergency call center based on the call mode determined.

In some embodiments, the call mode may be an emergency call mode or an ordinary call mode. The connection-built unit includes: a first calling unit which is adapted to call the emergency call center using an emergency call mode to deliver the requested emergency call category to the emergency call center, if the determined call mode is the emergency call mode; and a second calling unit which is adapted to call the emergency call center using a destination number corresponding to the requested call category, if the determined call mode is the ordinary call mode.

In some embodiments, the apparatus may further include a first prompting unit which is adapted to: if the determined call mode is determined as the ordinary call mode and the communication terminal is not equipped with a SIM card, provide a first prompt of inserting into SIM card or dialing the destination number by other ways.

In some embodiments, the apparatus may further include a third calling unit which is adapted to: if the retrieving unit is unable to determine the call mode corresponding to the current country or region information and the requested emergency call category, call the emergency call center based on the requested emergency call category.

In some embodiments, the apparatus may further include an updating unit which is adapted to: update the emergency call information stored in the first storage region based on the real-time emergency call information stored in the second storage region, wherein the second storage region is set in a server corresponding to the communication terminal.

In some embodiments, the apparatus may further include a second prompting unit which is adapted to: if the retrieving unit obtains no result by retrieving the first storage region based on the current country or region information and the requested emergency call category, provide a second prompt of retrieving the real-time emergency call information stored in the second storage region or dialing an emergency phone number manually.

In some embodiments, the apparatus may further include: an offering unit which is adapted to provide a plurality of emergency call options on the user interface of the communication terminal; and a triggering unit which is adapted to trigger the emergency request when one of the emergency call options is selected.

It should be noted that, the method for processing an emergency call of a communication terminal as recited above relating to FIG. 1 to FIG. 3 is able to be employed to the apparatus, which will not be described herein.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. A method for processing emergency call of a communication terminal, comprising:
presetting the communication terminal with multiple emergency call categories;
obtaining current country or region information based on resident cell system information of the communication terminal;
when an emergency request, which contains one of the multiple emergency call categories requested by a user, is received, retrieving a first storage region based on the current country or region information and the requested emergency call category to determine a call mode corresponding to the requested emergency call category in the current country or region, where the first storage region stores call modes corresponding to multiple emergency call categories and multiple countries and regions; and
the call mode comprises an emergency call mode and an ordinary call mode; and responding to the emergency request based on the determined call mode.

2. The method according to claim 1, wherein each of the multiple countries and regions is represented in the first storage region as at least one selected from a group consisting of a mobile country code, a mobile network code, and a country or region name.

3. The method according to claim 1, if the call mode corresponding to the one of the multiple emergency call categories is the ordinary call mode, the first storage region further stores a destination number corresponding to the one of the multiple emergency call categories.

4. The method according to claim 3, wherein responding to the emergency request based on the determined call mode comprises:
  if the determined call mode is an emergency call mode, calling the emergency call center using the determined emergency call mode to deliver the requested emergency call category to the emergency call center; or
  if the determined call mode is an ordinary call mode, calling the emergency call center using a destination number corresponding to the requested emergency call category.

5. The method according to claim 1,
wherein responding to the emergency request based on the determined call mode comprises:
providing a first prompt of inserting SIM card into the communication terminal, if the determined call mode is an ordinary call mode and the communication terminal is not equipped with a SIM card.

6. The method according to claim 1, further comprising:
if no result is obtained by retrieving the first storage region based on the current country or region information and the requested emergency call category, calling the emergency call center using an emergency call mode to deliver the requested emergency call category to the emergency call center.

7. The method according to claim 1, wherein the first storage region is set in the communication terminal.

8. The method according to claim 7, wherein information stored in the first storage region is updated based on information stored in a second storage region set in a server, where the second storage region stores real-time information corresponding to multiple emergency call categories and multiple countries and regions.

9. The method according to claim 8, wherein information in the first storage region and real-time information in the second storage region are both stored in a list form.

10. The method according to claim 8,
wherein responding to the emergency request based on the determined call mode comprises:
if no result is obtained by retrieving the first storage region based on the current country or region information and the requested emergency call category, providing a second prompt of retrieving the second storage region or dialing an emergency phone number manually.

11. The method according to claim 1, further comprising:
providing a plurality of emergency call options with preset call categories on a user interface of the communication terminal, where the emergency call request is triggered when one of the plurality of emergency call options is selected.

12. An apparatus for processing emergency call of a communication terminal, wherein the communication terminal is preset with multiple emergency call categories, comprising:
  a first storage region adapted to store call modes corresponding to multiple emergency call categories and multiple countries and regions;
  an acquisition unit adapted to obtain current country or region information based on cell system information of the communication terminal;
  a retrieving unit which is adapted to: when an emergency request which contains one of the multiple emergency call categories requested by a user is received, retrieve the first storage region to determine a call mode corresponding to the requested emergency call category in the current country or region; and
  the call mode comprises an emergency call mode and an ordinary call mode; and a connection-built unit adapted to connect with an emergency call center based on the determined call mode.

13. The apparatus according to claim 12, wherein the connection-built unit comprises:
  a first calling unit which is adapted to: if the determined call mode is an emergency call mode, call the emergency call center using the determined emergency call mode to deliver the requested emergency call category to the emergency call center; and
  a second calling unit which is adapted to: if the determined call mode is an ordinary call mode, call the emergency call center using a destination number corresponding to the requested call category.

14. The apparatus according to claim 12, further comprising a first prompting unit which is adapted to: provide a first prompt of inserting SIM card into the communication terminal, if the determined call mode is an ordinary call mode and the communication terminal is not equipped with a SIM card.

15. The apparatus according to claim 12, further comprising a third calling unit which is adapted to: if no result is obtained by retrieving the first storage region based on the current country or region information and the requested emergency call category, call the emergency call center using an emergency call mode to deliver the requested emergency call category.

16. The apparatus according to claim 12, further comprising: a second storage region which is set in a server and adapted to store real-time information corresponding to multiple emergency call categories and multiple countries and regions; and an updating unit which is adapted to update information stored in the first region based on information stored in the second storage region.

17. The apparatus according to claim 16, further comprising a second prompting unit which is adapted to: if the retrieving unit obtains no result by retrieving the first storage region based on the current country or region information and the requested emergency call category, provide a second prompt of retrieving the second storage region or dialing an emergency phone number manually.

18. The apparatus according to claim 12, further comprising: an offering unit adapted to provide a plurality of emergency call options with preset call categories on a user interface of the communication terminal; and a triggering unit adapted to trigger the emergency request when one of the plurality of emergency call options is selected.

* * * * *